United States Patent

Woods

[11] Patent Number: 5,887,453
[45] Date of Patent: Mar. 30, 1999

[54] PROTECTIVE MATERIAL

[76] Inventor: Roderick Ian Woods, 8, Coppice Avenue, Great Shelford, Cambridge CB2 5AQ, United Kingdom

[21] Appl. No.: 732,934

[22] Filed: Oct. 17, 1996

[30] Foreign Application Priority Data

Oct. 17, 1995 [GB] United Kingdom ............... 9521216

[51] Int. Cl.⁶ ........................... A41D 13/00; D04B 21/02
[52] U.S. Cl. ............................ 66/171; 66/195; 66/196; 66/202; 2/2.5; 2/455; 442/315
[58] Field of Search .................... 2/455, 456, 16, 2/167, 2.5, 48, 464, 465, 466, 467, 904; 66/171, 191, 194, 190, 202; 442/315, 318, 319; 428/911; 156/180, 181, 182

[56] References Cited

U.S. PATENT DOCUMENTS 4,912,781  4/1990  Robins ........................................ 2/167

FOREIGN PATENT DOCUMENTS 3731878  1/1989  Germany .

OTHER PUBLICATIONS

English–language Abstract of DE 37 31 878.

Primary Examiner—John J. Calvert
Assistant Examiner—Larry D. Worrell, Jr.
Attorney, Agent, or Firm—Ladas & Parry

[57] ABSTRACT

A protective material from which a protective garment such as is used by motorcyclists is made, and has an outer layer of fibres having a high softening temperature 400° C. and a mass (580 g.m$^{-2}$ to 620 g.m$^{-2}$) to provide high quality abrasion resistance. The outer layer is preferably two separate sheets one preferably being of Terry Loop knitted fabric, and the other of high tenacity Polyester having a 300 g.m$^{-2}$ upwards warp knit permitting high air flow therethrough. An inner layer conveniently of a Polyamide Rachel knit supports an impact attenuating layer preferably made from one of Polyurethane, Polynorbornene, Nitrile/PVC or synthetic rubber. The impact attenuating layer is preferably solid and flexible, is attached to the inner layer between the outer and inner layers. The material so formed provides sufficient abrasion resistance and high tensile strength together with permeability through the material which is ensured by providing through holes directly through the impact attenuating material.

31 Claims, 3 Drawing Sheets

PROTECTIVE MATERIAL

BACKGROUND OF THE INVENTION

This invention relates to a protective material particularly but not solely for use in the manufacture of garments which would be used by motor cyclists to provide them with adequate protection against injury in accidents involving road surface impacts whilst not imposing an excessive thermal load on the rider in warm weather.

It is generally well known that motor cyclists, for example, will ride their motor cycles wearing normal street clothing which provides very little protection in road surface impacts, or will alternatively use specialist leather clothing which provides better protection. Racing motor cyclists almost always wear leather clothing but only high quality thick leather provides good protection in accidents. However, leather is in itself impermeable to wind and this leads to overheating of the rider during warm weather because body heat is retained causing excessive sweating inside the garment. To combat this effect perforated leather has been used but if a high visibility garment is worn over the perforated leather, such as the type of garment used by motor cycle traffic policemen, then air flow becomes considerably reduced with the resultant overheating of the motor cyclist in hot weather.

Impact protection has been provided in motorcycle riders' clothing for some years by the insertion of plastic or synthetic rubber foam materials, solid flexible materials, plastic sheet materials which may be somewhat stiffer and various combinations of these materials. Some or all of these layers are impermeable to wind. There are some designs of the material which do allow for air circulation within or below them relative to the skin of the rider. Disadvantageously, where this protection is held against the body by the clothing stretching over the knees, the movement is restricted and heat builds up generating sweat which leads to discomfort when the bike rider is too hot. In such garments as has been referred to, the evaporation of sweat from below the impact padding is not achieved using perforations in leather over or around the impact padding. This is also the case when normal street clothing fabrics, or normal woven motorcycle riders' fabric clothing are used because there is insufficient air movement beneath the impact protection in any of these combinations.

Therefore, for the protection of motor cyclists, for example, though the material qualities of leather have been found to be good, leather has to be perforated or provided with other systems to ventilate the clothing. Fabric clothing generally provides very poor protection from abrasions and cuts, and even high performance fabric clothing which is generally a multi-layer woven material and is impermeable to wind is still a poor protection from abrasions and cuts in a high speed accident. Any impact protection which is provided by foams, plastics etc. in pads is generally found to be impermeable to wind and sweat causing overheating of riders in hot weather. The sweat is not evaporated from below an impact protection material and consequently dampness builds up, adversely.

To overcome these particular problems manufacturers of such materials for use in protective clothing have utilised lightweight honeycomb materials of metal, plastics, paper and composites such as are used in construction boards and aerospace materials. These provide rigidity for particularly low weight. However, when honeycomb materials are used as impact energy absorbers the compression of the honeycomb structure of the rigid walls causes crumpling. The particular disadvantages to be found with such a material are that only one single use is possible because having crumpled their recovery is almost non-existent, and they are rigid.

Similar materials which are made from various plastics and welded into hexagonal cells or manufactured from parallel tubes bonded together will give flexible lightweight systems with some recovery after impacts. HEXCEL (Registered Trademark) and AEROLEN (Registered Trademark) are hexagonal cell materials which have been used in products such as trauma packs for wearing beneath ballistic armour. Although the products provide spacing between layers, some energy absorption, and are light, the performance of the products is not adequate for padding in motorcyclists clothing where the force level of impacts can be very high and thick materials are not acceptable in that they restrict movement.

Perforated plastics have been used in products such as football players' shin-guards but not with exclusively air permeable materials and sweat is therefore not able to evaporate through them. Although perforated foam materials have been used in footwear to "aid air circulation" they are generally used in conjunction with impermeable layers and therefore do not function to assist sweat evaporation.

The problem of allowing sweat to evaporate from adjacent to the skin has been met to some extent by some bulk air impermeable materials such as GORETEX (Registered Trademark) and AQUATEX (Registered Trademark) which are used in clothing. Because these products are fully windproof and do not permit bulk air movements sweat generated on the skin has to evaporate in relatively still air and to diffuse to the surface layer of the clothing, or the inner lining of the GORETEX or similar material, before escaping from the clothing. However, the amount of sweat which can be evaporated in this way with materials such as GORETEX is limited.

SUMMARY OF THE INVENTION

It is an object of the present invention to provide a protective material for use in protective garments which will substantially overcome the above described difficulties.

According to one aspect of the present invention there is provided a protective material for protective clothing comprising a outer first layer of heat and abrasion resistant fibres of a loop knitted form, and adjacent thereto a second layer of knitted fibres having a high tenacity, the loops of the loop knitted fibres of the outer first layer being directed towards the outside of the protective material.

According to one embodiment in accordance with the present invention there is provided a protective material, comprising an innermost third layer of knitted fibres and a solid flexible intermediate fourth layer between the second and third layers of an impact attenuating element having a plurality of holes extending directly therethrough from one side to the other side thereof to allow air flow through the impact attenuation element so that upon receiving an impact energy is absorbed by distortion and compression of the impact attenuating element into the holes.

In one embodiment of the protective material according to the present invention the first outer layer comprises two separate sheets, of which one sheet includes fibres having a high softening temperature. The further sheet is of a mass which provides high abrasion resistance. Conveniently the two sheets comprising the first outer layer are connected together by the stitching of the seams of clothing made from the protective material.

Conveniently, the fourth intermediate layer is a single layer of flexible material. Alternatively, the intermediate layer comprises a plurality of partially overlying layers of impact attenuating elements with each layer being movable relative to another adjacent layer.

Preferably, the intermediate or impact attenuating layer is made from polyurethane, polynorbornene, Nitrile/PVC, rubber or synthetic rubber. When the impact attenuating element is a foam it can be up to 30% of air as in the foam NORSOREX 1910 (Registered Trademark). Conveniently, the fabric defining the inner layer is a polyamide rachel knit which is a knitted or mesh fabric to provide smooth skin contact, comfort, ease of movement and permeability.

A continuous outer first layer ie. not in discrete patches is formed preferably of a Terry Loop knitted fabric. Conveniently this fabric has a mass of 500 g.m$^{-2}$ to 700 g.m$^{-2}$ to provide adequate abrasion resistance, for example, to protect a rider sliding along a road surface in the run-out phase of an accident. A preferred mass range for the Terry Loop knitted fabric is 580 g.m$^{-2}$ to 620 g.m$^{-2}$. Preferably, the further sheet of material of the first outer layer is a high tenacity polyester having a mass of 300 g.m$^{-2}$ to 450 g.m$^{-2}$, preferably a mass of 400 g.m$^{-2}$. It is a warp knit permitting high airflow therethrough.

Conveniently, a knitted or meshed lining can be provided inside the protective material to provide skin contact comfort and ease of movement. A non-absorbent fabric of polyamide or polyester is particularly suitable as a lining. The lining lies on the side of the inner layer remote from the side thereof adjacent to the outer first layer.

Conveniently, the protective material so formed may have on its outermost external surface a fabric which permits the garments made from the protective materials to be of "high visibility" or conform to a uniform or to a fashion style. Such outer fabric may be of an open knitted or mesh material to provide high wind permeability for warm weathers, or alternatively, the outer layers for cold weathers may be a wind-proof fabric. In wet weather the knitted or mesh garment layer may be replaced with a waterproof fabric, or this may be worn separately over the top.

DESCRIPTION OF PREFERRED EMBODIMENT

Figure 1:
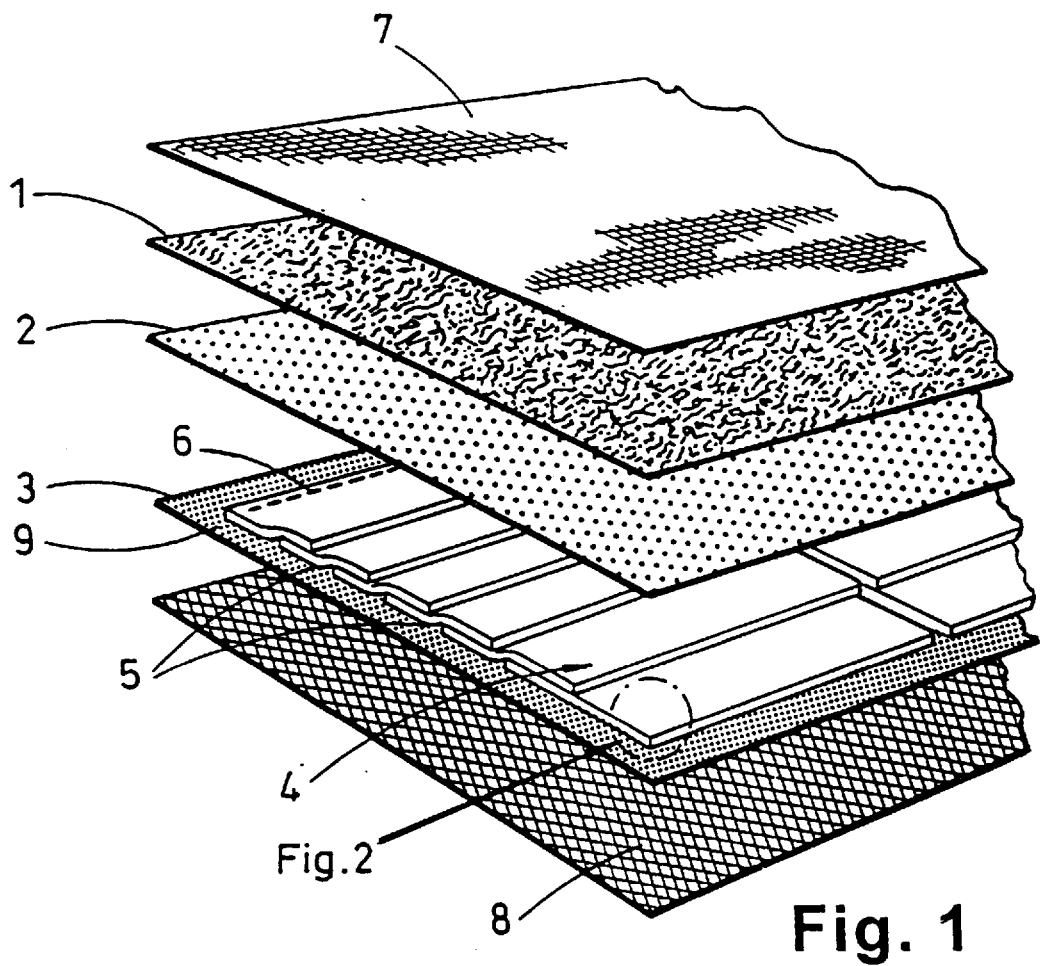
FIG. 1 is an enlarged expanded perspective view of part of a sheet of protective material according to the present invention.

Referring to FIG. 1 of the drawings there is shown part of a sheet of protective material according to the present invention. The protective material has an outer first layer comprising a sheet 1 of Terry Loop knitted fibre which is secured to a second layer comprising sheet 2 shown spaced from sheet 1 in FIG. 1 but secured to sheet 1 preferably by sewing (not shown) together into the seams of a garment. An inner third layer 3 of polyamide which is commonly known as "Archery Net", is also secured to sheets 1 and 2 in the finished form of the protective material, also by sewing into one or more seams, or through the sheets of material other than at the seams.

A solid flexible intermediate fourth layer constituting an impact attenuating element 4 is located between the outer and inner layers 2,3 respectively. The impact attenuating element 4 is shown to be divided into a plurality of separate elongate rectangular blocks 5 each having an S-shaped cross-section and each of which is attached by stitching 6 to the inner layer 3. Each block 5 overlaps the next adjacent block without secure attachment therebetween so that upon flexing the material the impact attenuating element 4 is arranged to flex with each block 5 moving slightly over the surface of the next adjacent block 5. The solid material can be foam up to 30% of air.

The protective material formed by the layers 1, 2 and inner layer 3 as well as the impact attenuating element 4 constitute the basic format for use over areas such as knees and shoulders, but this may be used as indicated in FIG. 1 with an external layer 7 of high visibility mesh, water-proof layer or a permeable or wind-proof fashion fabric layer. A mesh inner lining 8 is provided adjacent the free side of the inner layer 3 and attached thereto as appropriate. For areas at a low risk of impact then for example the knees and shoulders layer 3 and 4 are omitted.

The continuous protective outer layers 1,2 are provided by a combination of a Terry Loop knitted fabric 1 and a high tenacity polyester fabric 2 having a 400 g.m$^{-2}$ warp knit which provides the fabric combination of sheets 1 and 2 with a high tensile strength. The knitted loops of the Terry Loop knitted fabric 1 extend from the outermost side thereof, that is that side of the fabric 1 remote from the polyester fabric 2.

The continuous layers formed by the combination of sheets 1 and 2 utilises the Terry Loop knitted fabric which can be formed from any fibre having a high softening temperature is suitable, such as those which will not soften below a temperature of 400° C. Conveniently, temperature resistant para-aramid fibres found in materials known by the Registered Trademarks KEVLAR 29 or TWARON are particularly useful in this respect when of a mass within a range of 580–620 g.m$^{-2}$. Such a fabric with the loops on the outside provides adequate abrasion resistance to protect the rider sliding along a road surface in the run out phase of an accident because the loops are cut by the road surface and the fabric 1 gives a tufted carpet effect sliding over the road surface. However, these fabrics in themselves do not have an adequate tensile strength as previously indicated and therefore they are combined with a strong warp knitted fabric such as sheet 2 of high tenacity polyester of a 400 g.m$^{-2}$ warp knit. Both sheet 1, 2 permit a high air flow through them. The high tenacity polyester may be replaced by a high tenacity polyethylene or similar fibre.

As is shown in FIG. 1 the solid or foamed impact attenuating element 4 is fixed to one surface 9 of a knitted fabric 3 which is sewn by stitching remote from and around the outer edge of the impact attenuating layer to the inside surface of the continuous protective outer layers, that is the innermost side 10 of sheet 2 and through to sheet 1. The solid or foamed elements may be of any suitable impact attenuating material such as Polyurethane, Polynorbornene, Nitrile/PVC, or synthetic rubber. Proprietry impact attenuating materials which are more commonly known by the Registered Trademarks NORSOREX, NOENE, VITACEL 8/60, CATANE and ASTROSORB are known. These elements are perforated by holes extending from one major surface to the opposite major surface of the sheet material so that air movement through them is possible. The inner layer 3 on which the impact attenuating material is mounted is a fabric of polyamide rachel knit more commonly known as "archery net", preferably having a mass of 450–550 g.m2. The open mesh of the archery knit and the passages or apertures formed by the holes through the impact attenuating element allow air to flow through the clothes and over the skin of a person wearing a garment made of the protective material according to the present invention.

The combination of impact attenuating element on archery net provides added abrasion protection in the areas of major road surface impacts, such as the knees, shoulders, elbows etc. Complete perforation of all the layers should not occur even in high speed falls onto the road surface. The provision of the impact attenuating element in a plurality of separate blocks 5 each fixed to the fabric inner layer 3 conveniently provides a greater ease of movement and comfort for the person wearing the garment, than if there had been direct attachment of the impact attenuating element to the outer protective layer.

The mechanical protective qualities of the outer layer 7 of high visibility mesh, water-proof material or fashion fabric, are not significant. The warm weather choice is to use open knitted or mesh materials which provide high wind permeability and can be of high conspicuity material meeting current European standards EN 471 and pr EN 1150. For cold weather a wind proof fabric outer would be used whilst in wet weather the knitted or mesh garment layer can be replaced with a water-proof fabric or this may be worn over the top of the open knitted or mesh.

The knitted or meshed fabric outers advantageously permit wind entry whilst the wind-proof and water-proof fabrics prevent wind entry. The choice of fabric permits the garments to have "high visibility" characteristics or to conform to a uniform or to a styled fashion.

It will be appreciated that energy dissipated during motorcycle accidents, for example, can be very high and skeletal injuries to motorcyclists are frequent, with the legs being particularly at risk as shown by accident statistics. Impermeable layers of padding have been used in trousers and these are particularly uncomfortable because these are held close to the skin by most motorcycle trousers which are cut to give a tight fit. Pads over the knees and upper shins are usually placed in areas where most wind could enter trousers to cool the riders, and possibly because of the discomfort riders frequently take out such padding, which places them at an increased risk of injury.

The impact attenuating elements currently used in motorcycle riders' clothing are usually dense and soft (400 kg.m$^-$3–750 kg.m$^{-3}$). Stiff or even hard foam can be used in much lighter pads but there are then the problems of hinging hard pieces together to give adequate comfort and protection. The soft dense elements have a structure of finely distributed air spaces and are soft because the rubbery material can flex and air holes can change shape. The elements work, during impacts, by being compressed and distorted so that gross structural and molecular distortion alters the time course of the force impulse of the impact.

With the new impact attenuating elements, which are used in the formation of the protective material according to the present invention holes are punched, cut or moulded directly through the impact attenuating element and depending of the physical characteristics of the polymer mix which is being used, the holes need to be of different sizes and distribution.

For example, in harder materials the holes need to be closer together and of smaller diameter than in softer materials.

In one particular form of the impact attenuating element in which a 4 mm–8 mm thick sheet material known as ASTROSORB (Registered Trademark) has a plurality of cylindrical holes having a 4 mm internal diameter located in a square lattice pattern with 8 mm spacing between the centres of the holes has been found particularly suitable. If a stiffer impact attenuating material is used, such as that known as CATANE F (Registered Trademark), holes of 3.5 mm in diameter spaced at 7 mm centre to centre are better. These elements are particularly suitable for protecting the knees, hip, elbows and shoulders. A softer impact attenuating element is made using even smaller holes having a 2.5 mm diameter and being spaced centre to centre at 5 mm. The softer impact attenuating material used is known as NORSOREX 1910 (Registered Trademark) which is partly foamed polynorbornene of 500–650 kg.m$^{-3}$ and appears to give a product very suitable for use in gloves, for example, where a softer material is required to protect weaker bones such as those in the wrist or to prevent injuries caused by multiple impacts such as vibration.

As indicated above the size and spacing of the holes controls the performance of the material. Under compression during impact, the bulk of the material is squeezed laterally into the holes. When the holes are closed by first contact the structure becomes stiffer and compresses progressively less for further increases in the force applied, until the holes are almost obliterated when the material displays the property of the unperforated material. The holes also give the material increased flexibility when it is not compressed. This is important in providing comfort in normal use when it is not subject to impacts. Moreover, the material with holes orientated in the direction of the impacts can be more efficient than foamed material, so can be used in thinner layers for the same performance.

The lining as shown in FIG. 1 by the layer 8 is conveniently a knitted or meshed lining which is provided inside the other layers to present a soft innermost layer to provide comfort on skin contact and ease of movement. A non-absorbent fabric is particulary suitable being made of a polyamide or polyester. The innermost layer is preferably a polyamide rachel knit having a mass of 450–550 g.m2.

Figure 2:
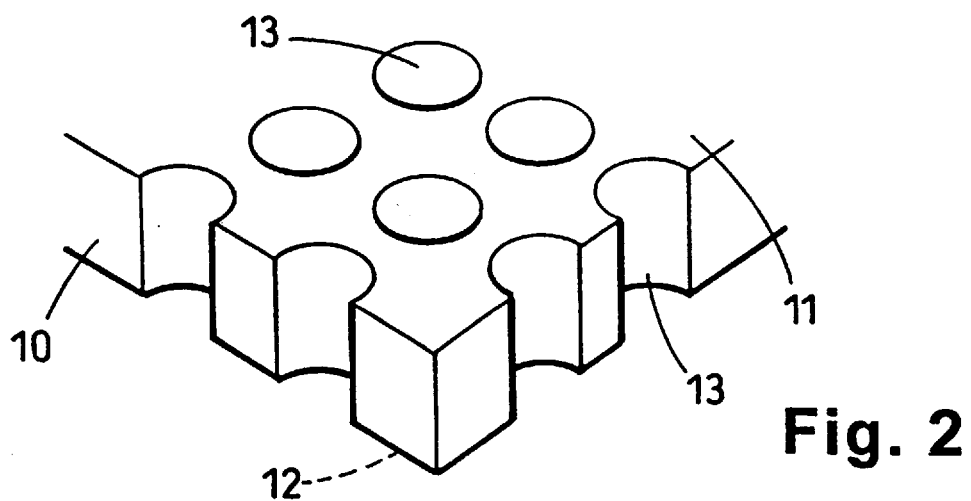
FIG. 2 is an enlarged partial perspective view of one portion of the impact attenuating layer usable in FIG. 1.

FIG. 2 shows in an enlarged partial view of a portion of a sheet of the impact attenuation element which has a body 10, upper and lower sides 11, 12, respectively, and through holes 13 extending directly, from upper side 11 to lower side 12. The body is of a solid flexible synthetic rubber.

Figure 3:
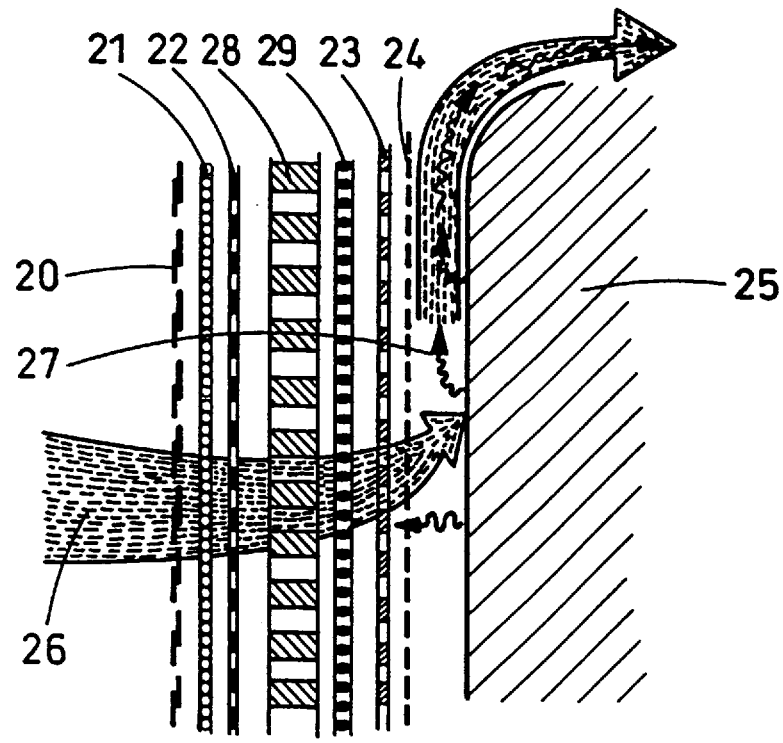
FIG. 3 is a diagrammatic illustration of the permeability of the protective material of FIGS. 1 and 2.

FIG. 3 discloses diagrammatically one form of protective material used in the manufacture of garments for motorcyclists, for example, in which the material is permeable to air impacting on the outside of the garment to flow through the material onto the skin to aid evaporation of sweat and to cool the body. The air flow encircles the body and is removed through the material in low pressure areas at the back of the body. Here mesh 20 of "high visibility" fabric having high wind permeability and high conspicuity meeting current European Standards EN 471 and pr EN 1150 will be used. The mesh in FIG. 3 covers a KEVLAR (Registered Trademark) knit conveniently in the form of a Terry Loop fabric covering a polyester warp knit and a mesh lining 21, 22 and 23, respectively. This protective material forming a motorcyclists' garment for example covers the motorcyclists clothing 24 worn over the body 25. An enlarged arrow 26 indicates the amount and direction of wind flow in use through the protective material to the skin of the body of the wearer of the garment. The smaller thick black arrows 27 indicate heat which generates sweat which evaporates and is mainly removed by the airflow around the body so that sweat evaporation cools the body. Such a combination of meshes and knits is particular good in very hot climatic conditions but has very little impact attenuation. The impact attenuation is provided by the addition of the perforated impact attenuating element attached to archery net as shown in FIG. 3.

Figure 4:
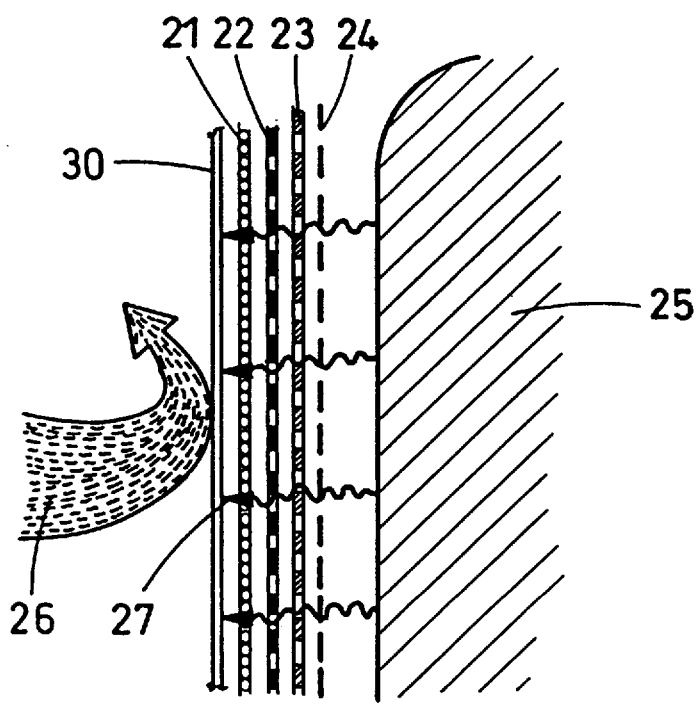
FIG. 4 is a diagrammatic illustration of the permeability of a protective material according to the present invention without impact attenuation material.

The similar protective material as is described in FIG. 3 is illustrated in FIG. 4 but without the impact attenuating element and its archery net support, and in place of mesh 20 there is provided in FIG. 4 a water-proof or wind-proof outer fabric, of which either can be water vapour permeable. The water-proof or wind-proof outer layer is shown at 30 and the arrow 26 representing wind flow in use is shown to be deflected by the water-proof outer layer so that the wind or air cannot penetrate into the material. Thereby heat builds up as indicated by the arrows 27 between the layers of the protective material of the motorcycle garment resulting in heat being retained by air spaces in the fabrics and between fabrics. Sweat generated by the heat forms on the wearer's skin although a small amount of vapour formed by evaporated sweat can permeate through the water-proof outer layer 30. Whilst this system is good on wet or cold days it leads to overheating of the motorcyclist in hot climatic conditions.

Figure 5:
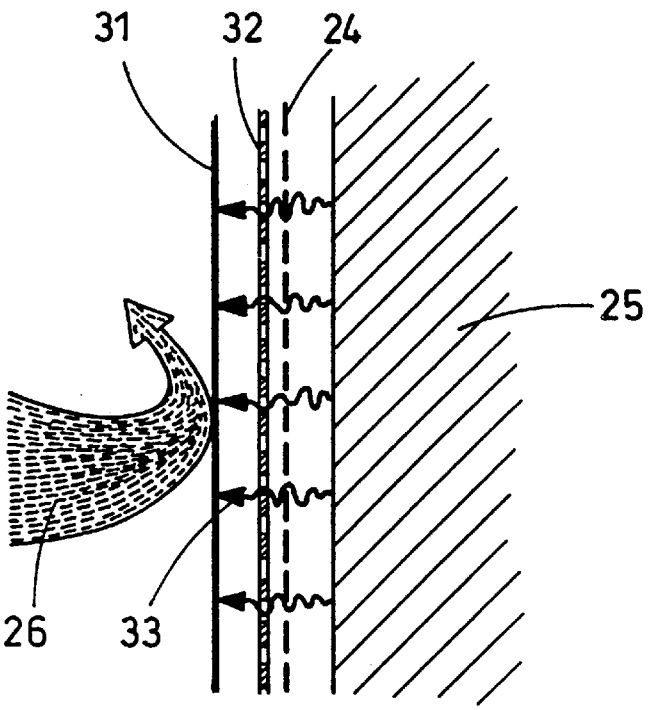
FIG. 5 is a diagrammatic illustration of the impermeability of leather as a known protective material.

Referring to FIG. 5 there is illustrated one current form of motorcycle garment made from leather 31 having a lining 32. Whilst leather is wind-proof it is not water-proof and again heat is retained within air spaces in the lining fabric 32 and between the fabrics (leather 31 and lining 32) and riders' clothing 24. Although this arrangement may be good on dry cold days it is not particularly suitable during wet conditions and neither is it permeable thereby trapping heat and sweat 33 generated thereby between the leather 31 and the body 25. This can result in the motorcyclist becoming overly hot particular in warm climatic conditions.

Figure 6:
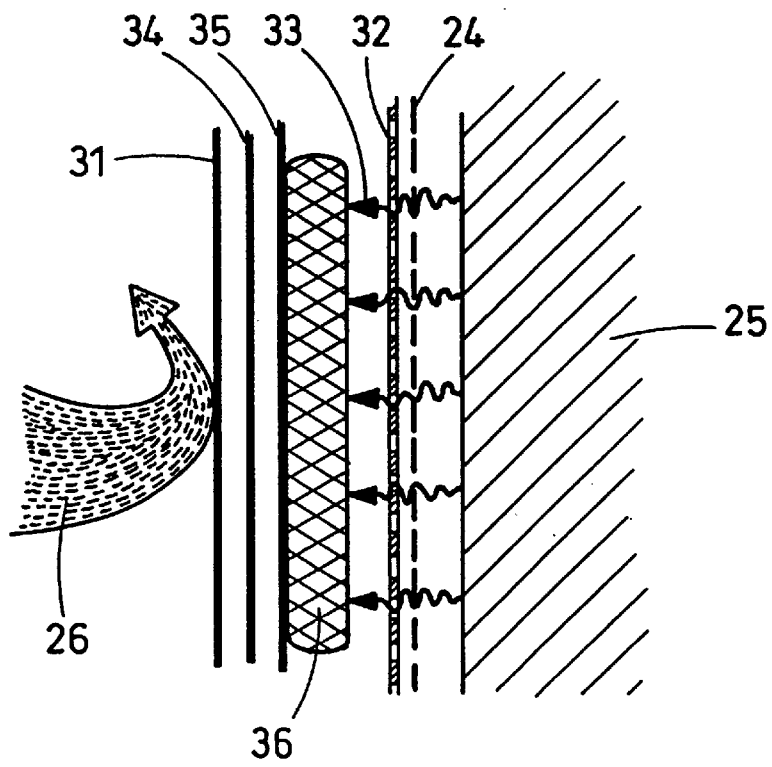
FIG. 6 is a diagrammatic illustration of the impermeability of a specific part of a leather garment for protecting a joint such as a knee joint.

In FIG. 6 there is illustrated diagrammatically a specific area of a leather garment which is intended to protect a joint such as a knee joint of a motorcyclist for example. At this joint there is formed a double layer of leather 31, 34 and a plastics outer shell 35 on a block of plastic foam 36. The shell 35 is solid and impermeable as of course are the layers 31, 34 of leather, therefore provided where the garment is stretched over the knee a severe heat retention resulting in the formation of sweat which is very uncomfortable and distracting for the motorcyclist.

Therefore, there has been disclosed a protective material in accordance with the present invention which when used to manufacture garments used by motorcyclists permits air flow through the layers thereof over the whole surface of the protective material. Wind for example entering into the front of a riders' clothing can penetrate through to the skin so that sweat which may be generated as a result of increased temperature of the person wearing the garment, can be evaporated directly from the skin, cooling the skin of the rider. This is achieved by warm moist air being exited from the clothing in any low air pressure area, such over the whole of the back of the garment during forward motion of the motor cycle. Moreover, the protective material is relatively light in weight and is cheap to make and therefore cost effective.

High quality accident protection is provided simultaneously by separate materials each providing a specific form of protection. The materials are combined so that they protect each other.

The lightweight outer mesh, wind-proof or water-proof layers which are used are preferably detachable. These lightweight layers protect the inner material from some soiling and they are themselves easily washed or replaced when dirty.

The Terry Loop knitted para-aramid fabric is particularly useful to protect the high tenacity polyester sheet from abrasion as might be experienced by a person skidding along the ground following an accident and generating sufficient friction that could otherwise melt the high tenacity polyester sheet. In its turn the high tenacity polyester warp knit protects the Terry Loop knitted para-aramid from excessive tensile forces that could otherwise pull the loops into the knit and disrupt its integrity.

The impact attenuating element is protected from continuous abrasion and high tensile forces by being fixed to the archery net which is itself attached to the outer layer outside the main impact areas preventing dislodgement in serve impacts. Advantageously, the impact attenuating elements are soft and mould or flex during impact so that the area of contact of the Terry Loop knitted fabric between road surface irregularities and joints such as the knee or elbow are increased and very high pressures in small areas are reduced. This enhances the abrasion resistance performance of the Terry Loop material.

In uses where greater softness is required or a greater thickness in padding systems is acceptable, the protective material according to the present invention can be used with foamed or similar materials containing air spaces. Such use includes horse riders body protectors and, hockey players and cricketers' body and limb pads. Protective padding for ball and puck sports often uses an outer layer of material such as a sheet of low density polyethylene or PVC. This performs by absorbing energy when it is stretched by the ball on impact as the material below it is compressed and a depression is formed. As the compression occurs the impact forces are spread thus dampening the effect of the impact. Conveniently, as previously described, the foam or synthetic rubber and the outer layers are perforated by holes through the sheet materials to provide air flow. With a suitable choice of hole size and spacing and the use of thick enough elements, adequate impact performance is maintained while allowing good air flow both into and out of the garment utilising the material according to the present invention.

In an alternative embodiment in accordance with the present invention the first outer layer comprises two separate sheets, of which one sheet includes fibres having a high softening temperature. The other sheet is of a mass which provides high abrasion resistance. Conveniently the two sheets comprising the first outer layer are connected together by the stitching of the seams of clothing made from the protective material.

Conveniently, the further sheet of material of the outer first layer is a high tenacity polyester having a mass of 300 $g.m^{-2}$ to 450 $g.m^{-2}$, preferably a mass of 400 $g.m^{-2}$. It is a warp knit permitting high airflow therethrough.

The foregoing describes exemplary embodiments and modifications may be made and such modifications within the spirit and scope of the appended claims are intended to be included in the present invention.

I claim:

1. A protective clothing material for use in motorcycling garments comprising an outer first layer having high heat and high abrasion resistant fibres of a loop knitted form and a second layer of warp knitted fibres having a high tenacity, wherein the loop knitted fibres of the first layer are directed towards the outside of the protective material, and wherein the heat and abrasion resistant fibres of the first layer and the knitted fibres of high tenacity in the second layer have such qualities that, when a wearer impacts a road surface and slides along it following a high speed motorcycle crash, the layers resist tensile forces of an initial impact and heat generated by the frictional forces during the slide and is capable of remaining intact so as not to expose the wearer to contact with the road surface.

2. A protective material for use in motorcycling garments comprising an outer first layer having high heat and high abrasion resistant fibres of a loop knitted form, a second layer of knitted fibres having a high tenacity, an innermost third layer of knitted fibres located on the side of the second layer remote from the first layer, and a fourth layer of solid flexible material located between the second and third layers constituting an impact attenuating element having a plurality of holes extending directly therethrough from one side to the other side thereof to allow air flow through the impact attenuating elements and to allow impact forces to be attenuated by distorting and compressing the material into the holes.

3. A garment made from a protective clothing material comprising an outer first layer having high heat and high abrasion resistant fibres of a loop knitted form and a second layer of warp knitted fibres having a high tenacity, wherein the loop knitted fibres of the first layer are directed towards the outside of the protective material, and wherein the heat and abrasion resistant fibres of the first layer and the knitted fibres of high tenacity in the second layer have such qualities that, when a wearer impacts a road surface and slides along it following a high speed motorcycle crash, the layers resist tensile forces of an initial impact and heat generated by the frictional forces during the slide and is capable of remaining intact so as not to expose the wearer to contact with the road surface.

4. A garment made from a protective material comprising an outer first layer having high heat and high abrasion resistant fibres of a loop knitted form, a second layer of knitted fibres having a high tenacity, an innermost third layer of knitted fibres located on the side of the second layer remote from the first layer, and a fourth layer of solid flexible material located between the second and third layers constituting an impact attenuating element having a plurality of holes extending directly therethrough from one side to the other side thereof to allow air flow through the impact attenuating elements and to allow impact forces to be attenuated by distorting and compressing the material into the holes.

5. A material as claimed in claim 1, comprising an innermost third layer of knitted fibres located on a side of the second layer remote from the first layer, and a fourth layer of solid flexible material located intermediate the second and third layers being an impact attenuating element defining a plurality of holes extending directly therethrough from one side to the other side thereof to allow air flow through the impact attenuation element so that upon receiving an impact energy is absorbed by distortion and compression of the impact attenuating element into the holes.

6. A material as claimed in claim 1, wherein the first layer comprises first and second separate sheets of which the first sheet includes fibres having a high softening temperature.

7. A material as claimed in claim 3, wherein the second sheet comprises a mass which provides a high abrasion resistance.

8. A material as claimed in claim 1, wherein the first and second layers are connected by stitching of the seams of a garment of clothing made from the protective material.

9. A material as claimed in claim 7, wherein the second layer is a high tenacity polyester.

10. A material as claimed in claim 9, wherein the high tenacity polyester is a 400 g.m$^{-2}$ warp knit permitting high air flow therethrough.

11. A material as claimed in claim 5, wherein the impact attenuating element comprises a plurality of partially overlying parts with each part being movable relative to another adjacent part.

12. A material as claimed in claim 5, wherein the impact attenuating element is a single continuous layer of flexible material.

13. A material as claimed in claim 5, wherein the impact attenuating element is made from any one of polyurethane, polynorbornene, Nitrile/PVC, rubber or synthetic rubber.

14. A material as claimed in claim 5, wherein the innermost third layer is a polyamide rachel knit.

15. A material as claimed in claim 14, wherein the polyamide rachel knit has a mass of 450–550 g.m$^{-2}$.

16. A material as claimed in claim 5, wherein the innermost third layer is a polyester rachel knit.

17. A material as claimed in claim 5, including an inner lining located on the side of the third layer remote from the second layer comprising a knitted or meshed fabric to provide smooth skin contact, comfort, ease of movement, and permeability.

18. A material as claimed in claim 1, including a lining of non-absorbent fabric of polyamide.

19. A material as claimed in claim 1, including a lining of non-absorbent fabric of polyester.

20. A material as claimed in claim 1, wherein the loop knitted fibres are a Terry Loop knitted fabric.

21. A material as claimed in claim 20, wherein the Terry Loop knitted fabric has a mass within the range of 580–620 g.m$^{-2}$ to provide adequate abrasion resistance.

22. A material as claimed in claim 1, wherein the protective material has located on its external surface a fabric which confers high visibility.

23. A material as claimed in claim 21, wherein the external fabric is of an open knit or mesh to provide high wind permeability for warm weather.

24. A material as claimed in claim 21, wherein the external fabric is of a mesh to provide high wind permeability for warm weather.

25. A material as claimed in claim 22, wherein the external fabric is a wind-proof fabric for use in cold weather.

26. A material as claimed in claim 22, wherein the external fabric is a water-proof fabric for use in wet weather.

27. A garment as claimed in claim 3, including a third innermost layer of knitted fibres located on the side of the second layer remote from the first layer, and a fourth layer of solid flexible material located intermediate the second and third layers being an impact attenuating element defining a plurality of holes extending directly therethrough from one side to the other side thereof to allow air flow through the impact attenuation element so that upon receiving an impact energy is absorbed by compression of the impact attenuating element into the holes.

28. A material as claimed in claim 1 wherein the loop knitted fibres of the first layer are directed towards the outside of the protective material.

29. A material as claimed in claim 1 wherein the second layer is warp knitted.

30. A material as claimed in claim 2 wherein the second layer is warp knitted.

31. A garment as claimed in claim 28, wherein the loop knitted material is a para-aramid.

* * * * *